United States Patent [19]
Erler et al.

[11] Patent Number: 5,706,168
[45] Date of Patent: Jan. 6, 1998

[54] IMPACT-RESISTANT NOTEBOOK COMPUTER HAVING HARD DRIVE MOUNTED ON SHOCK-ISOLATING MOUNTING BRIDGE AND IMPACT ATTENUATING COVERING

[75] Inventors: William F. Erler; Jonathan L. LaMarche, both of Spokane; David H. Stockham, Deer Park; Theodore C. Vollmer, Spokane, all of Wash.

[73] Assignee: Itronix Corporation, Spokane, Wash.

[21] Appl. No.: 499,488

[22] Filed: Jul. 7, 1995

[51] Int. Cl.⁶ .................. G06F 1/16; H05K 5/02
[52] U.S. Cl. .......................... 361/685; 361/683
[58] Field of Search ............. 364/708.1; 298/638; 312/223.2; 361/680–686

[56] References Cited

U.S. PATENT DOCUMENTS

| | | | |
|---|---|---|---|
| 4,571,456 | 2/1986 | Paulsen et al. | 361/680 X |
| 4,703,161 | 10/1987 | McLean | 235/1 D |
| 5,195,022 | 3/1993 | Hoppal et al. | 361/685 |
| 5,220,520 | 6/1993 | Kessoku | 364/708.1 X |
| 5,239,444 | 8/1993 | Sasaki | 361/683 |
| 5,351,176 | 9/1994 | Smith et al. | 361/681 |

FOREIGN PATENT DOCUMENTS

PCT/US89/04057  4/1991  WIPO ............ G01D 15/00

Primary Examiner—Michael W. Phillips
Attorney, Agent, or Firm—Wells, St. John, Roberts, Gregory & Matkin, P.S.

[57] ABSTRACT

An improved portable personal computer preferably configured to facilitate outdoor field-use has an impact attenuating case, a sealed keyboard, and a sealed mouse which facilitate use of the computer in harsh environments. The case has a impact attenuating covering in which is housed a hard drive on a shock-isolated mount and a display further mounted in die case in a resilient shock-isolated manner. The case, hard drive mount, and display mount cooperate to attenuate shock-induced damage resulting from impacts and sudden accelerations of the computer caused during rugged use. Furthermore, the sealed keyboard and mouse assemblies prevent any damage which might result from liquids migrating within the case and into the computer components.

14 Claims, 8 Drawing Sheets

IMPACT-RESISTANT NOTEBOOK COMPUTER HAVING HARD DRIVE MOUNTED ON SHOCK-ISOLATING MOUNTING BRIDGE AND IMPACT ATTENUATING COVERING

TECHNICAL FIELD

This invention relates generally to portable personal computers and more particularly to an impact-resistant notebook computer provided with impact attenuating features and a sealed water resistant keyboard interface construction especially suited for facilitating outdoor field use of the computer.

BACKGROUND OF INVENTION

In portable personal computers, commonly referred to as notebook computers, a lightweight plastic housing formed from a top case and a bottom case is used to support and house a screen, a computer, and interface devices. Typically, the cases form a mounting structure for fastening together the various components comprising the computer. For example, the top case typically houses a thin panel display which is fastened to one of the parts forming the molded plastic case. A pair of mounting hinges are typically provided at a bottom edge of the top case for rotatably mounting the top case to the back edge of the bottom case. In use, the top case is upwardly rotated away from the bottom case to a vertical position that is visually comfortable to a user. The top face of the bottom case typically receives a keyboard assembly through which a user can further interface with the internally housed computer. By downwardly rotating the top case into nested engagement with the bottom case, the display and keyboard become encased within a closed housing assembly. Typically, a latch is provided between the top and bottom cases alternately to secure and release them from the closed position. When closed and latched together, the computer can be readily hand-carried by a user.

Additionally, a typical notebook computer has a motherboard including a central processing unit, memory modules, and a hard drive mounted inside the housing. The motherboard is usually mounted inside the bottom case, beneath the keyboard. Additionally, a floppy drive is usually also provided in the bottom case having an access door formed in the side of the case to allow for insertion and removal of floppy disks from outside of the case.

When constructing a typical notebook computer, an effort is made to minimize overall weight while maximizing the computer's processing power and memory storage. In an effort to achieve this end, lightweight thin panel displays are incorporated into notebook computers. Secondly, the structure used to mount the various components of the computer is kept to a minimum, and in fact, the housing typically has molded-in reinforcements, ribs, and mounting bosses along its molded inner face to which components are mounted. Typically, the various circuit boards within the notebook computer are directly mounted with fasteners to the molded-in bosses and ribs.

However, as a result of the successful development of lightweight portable personal computers, users commonly transport their computers with them everywhere they go, subjecting the computers to harsh environments heretofore never seen by larger desk-top based computers. Furthermore, a likelihood that a computer will be dropped, kicked, or generally abused greatly increases when the device is made portable. Additionally, many users of these devices subject them to harsh environmental conditions, as the devices are found on maintenance vehicles used by telecommunications companies and railroad maintenance crews and they are commonly hand carried by individuals on gas pipeline service teams, civil engineering or construction sites, and geological engineering sites, and are even found on off-shore marine vessels.

In an effort to improve the outdoor field-use performance of existing notebook computers, attempts have been made to modify existing notebook computers originally designed for transportable desk top use between office sites. One aftermarket feature incorporated into notebook computers to enhance their weather resistance has been the addition of keyboard membranes over the keyboards on the computer to seal the keyboard from moisture damage. However, the membranes typically require the use of a separate outer housing for the computer to which the membrane seals so as to house the computer inside. Hence, water and spilled liquids are prevented from seeping through a computer keyboard and possibly ruining both the keyboard and the internal components of the computer. For example, utilization of portable computers within a factory can subject the computer to cutting fluids, fluids used in washing operations, and oily fluids resulting from constant keyboard contact with the greasy hands of an operator who must also physically manipulate a product during it's manufacture as well as input information into the computer. However, keyboard membranes are susceptible of forming rips and tears which cause leaks through the membrane. Secondly, the membranes by themselves do not conform and seal directly to the case of the computer. Hence, a separate external housing is usually used to completely encase the computer.

Additionally, in order to minimize the likelihood that a notebook computer will be damaged when it is dropped, kicked, or bumped during transport, it is common to stow the computer within a padded carrying case. However, the padded case provides little or no protection once the computer is removed during use. Therefore, the padded case provides little or no benefit during actual use.

The present invention relates to an improved construction for a portable personal computer that facilitates outdoor field-use of the computer and protects the computer from damage resulting from any impact that might occur, for example, if the computer is accidentally dropped. Additionally, the interface portion of the computer is sealed to prevent water damage resulting from either outdoor use, or spillage of liquids onto the computer.

Objects, features and advantageous of this invention are to provide an outdoor field-usable portable personal computer which can be easily and readily portably transported as a self contained unit, has impact attenuating features in both the housing and the internal components of the computer that protect the components of the computer from damage resulting from impacts and sudden accelerations, has a sealed interface construction including a sealed keyboard and a sealed mouse which prevents damage to each interface as weft as the computer components housed in the case resulting from leakage of liquids past the keyboard face into the computer housing. The invention preferably is constructed with an impact attenuating case that is rugged, durable, reliable, of simplified design and of relative economical manufacture and assembly while retaining enforced features of a dissipating impact attenuating case that houses computer components therein.

BRIEF DESCRIPTION OF THE DRAWINGS

These and other objects, features and advantageous of this invention will be apparent from the following detailed description, appended claims, and accompanying drawings in which

FIG. 13 is a partial breakaway exploded isometric view depicting the pocketed mounting of the uppercase and hinge to a receptacle of the lower case;

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
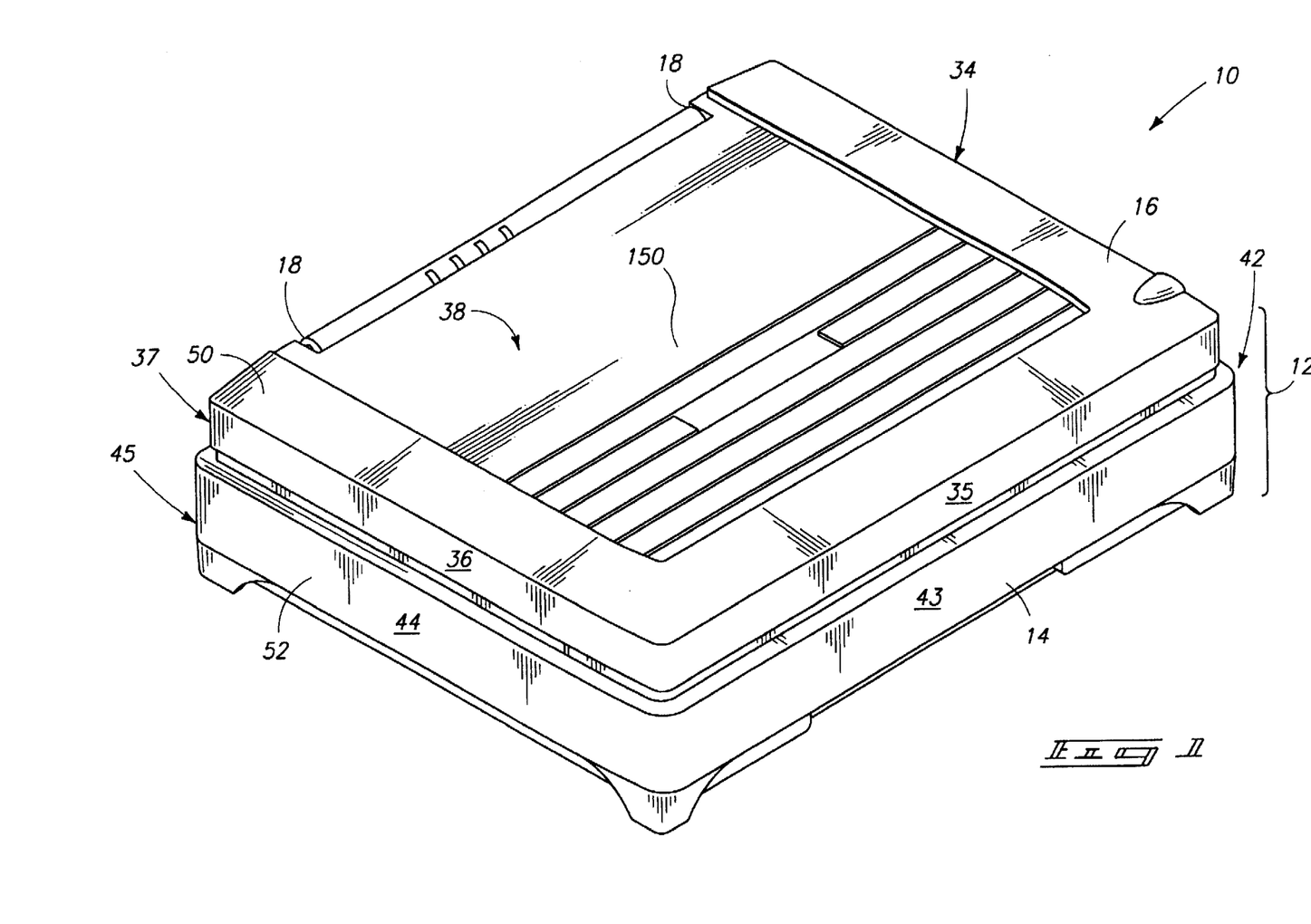
FIG. 1 is an isometric view of a notebook computer embodying this invention illustrating the screen folded down in a closed configuration in relation to the keyboard.
Figure 7:
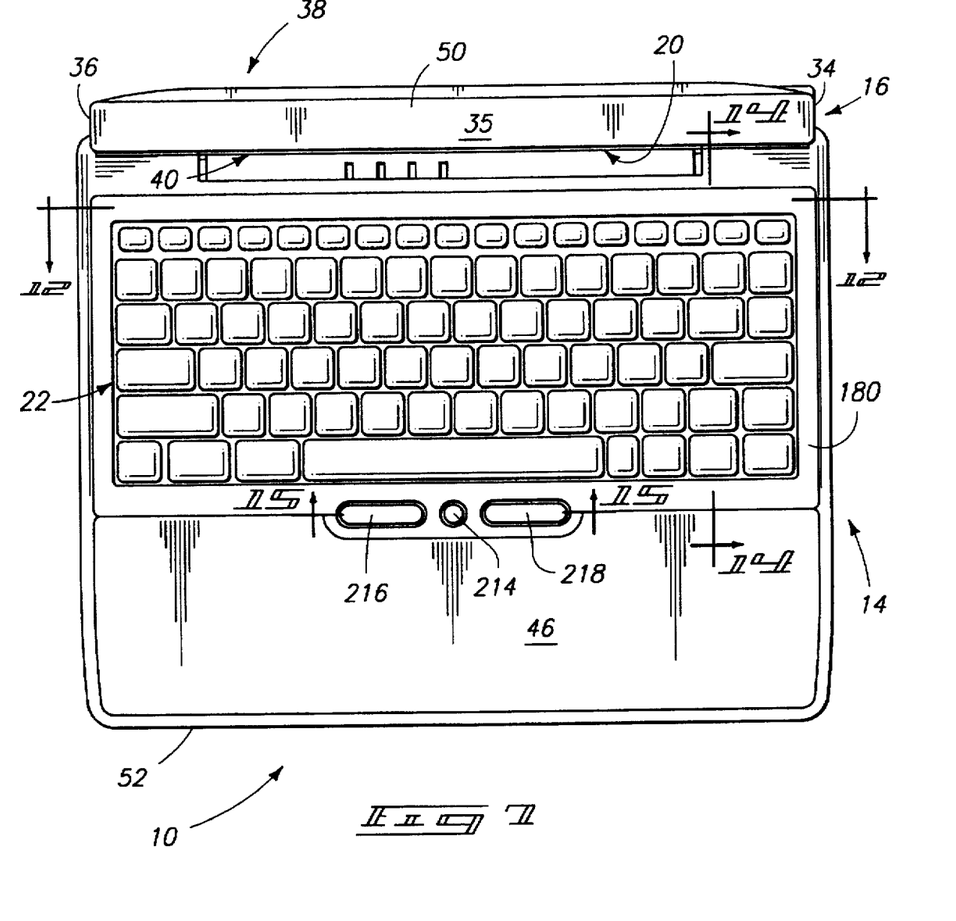
FIG. 7 is a plan view of the notebook computer of FIGS. 1–6 illustrating the screen opened in relation to the keyboard.
Figure 8:
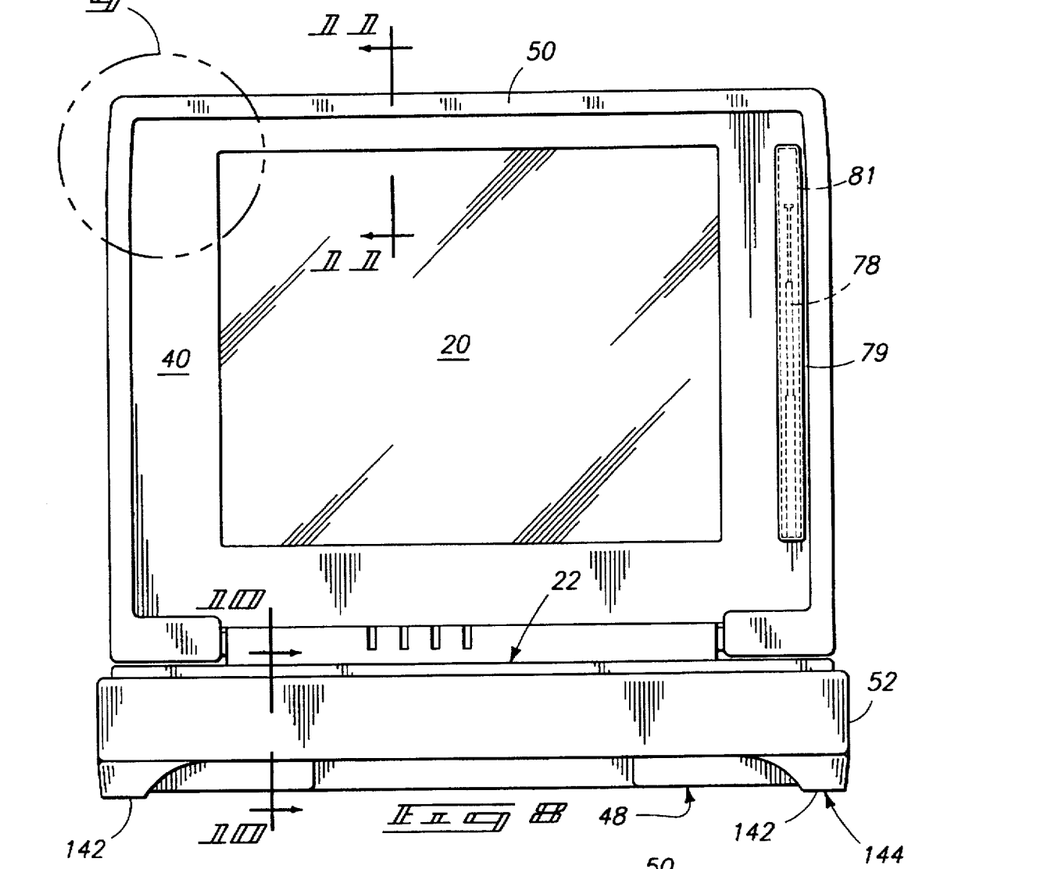
FIG. 8 is a front elevational view of the notebook computer as depicted in FIG. 7.

Referring in more detail to the drawings, FIG. 1 illustrates a portable personal computer namely a notebook computer 10 embodying this invention. The computer has a housing 12 formed by a lower case 14 and an upper case 15. Preferably, the upper case is rotatably carried by the lower case through a pair of hinges 18. In use, the upper case houses a thin panel display 20 in rotatable relation with the lower case, as shown in FIG. 8, such that a user can move the display and case from a closed, or stowed position into a vertically rotated in-use position. FIGS. 7 and 8 depict the computer in an opened, or in-use configuration wherein a keyboard 22 is also provided in a top surface, or face 24 of the lower case 14. Additionally, FIGS. 1–6 depict the same computer 10 in a closed, or slowed configuration.

Figure 10:
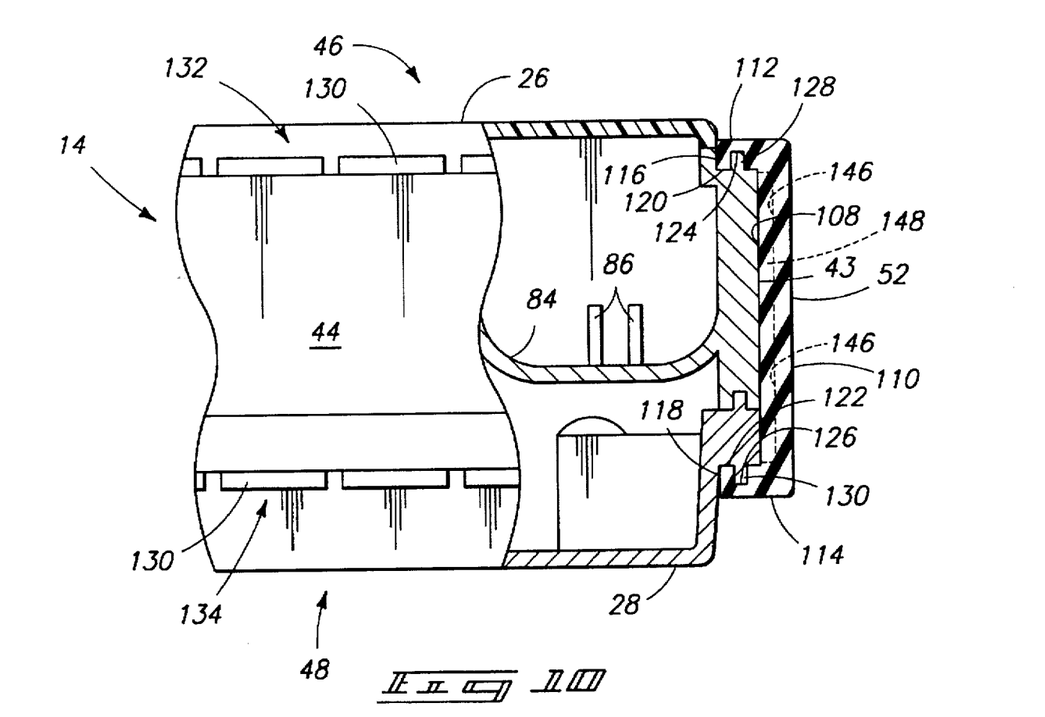
FIG. 10 is an enlarged partial sectional view taken generally along line 10—10 of FIG. 8 illustrating attachment of the lower cover to the lower case.

The lower case 14 is formed by fastening together a top shell 26 and a bottom shell 28 (see FIG. 10). Likewise, a front shell 30 and a back shell 32 are fastened together to form the upper case 16 (see FIG. 11). Preferably, threaded fasteners are used to assemble mating pairs of shells 26, 28 and 30, 32 together. Preferably, shells 26–42 are each formed from magnesium castings in order to provide a strong and rigid mounting structure for mounting the various internal components of the computer 10. Alternatively, aluminum or any of a number of other lightweight metal alloys could be utilized to form the structure. Similarly, shells 26–32 can be formed from lightweight composite materials including a resin and glass, carbon fiber, kevlar, or other enforcing fiber matrix construction.

Figure 11:
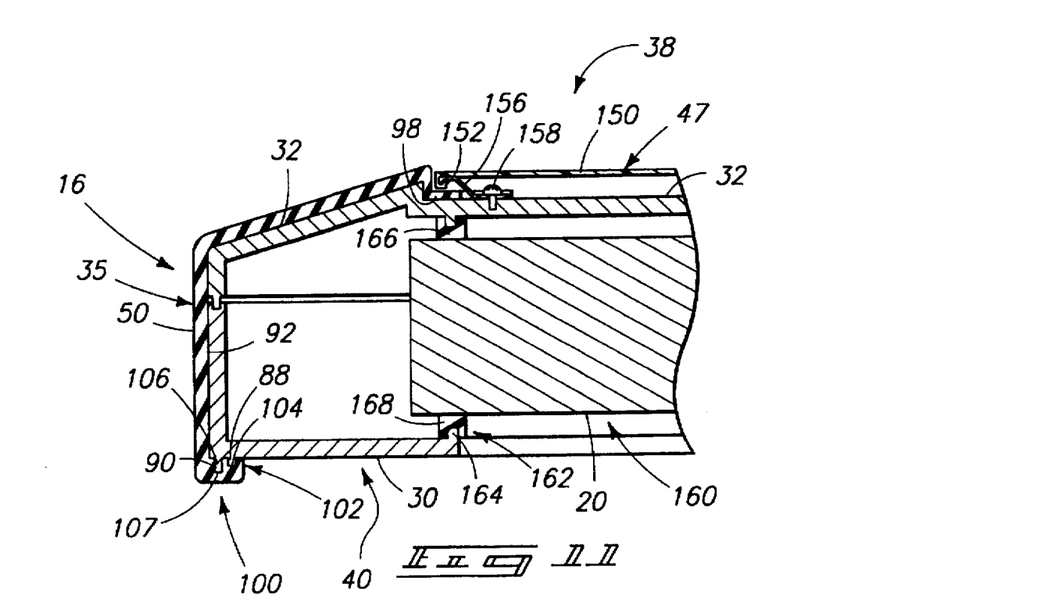
FIG. 11 is an enlarged partial sectional view taken generally along line 11—11 of FIG. 7 illustrating attachment of the cover, trim panel and screen to the upper case.

When joined together, shells 30 and 32 of FIG. 11 cooperate to form the upper case 16 which has side walls 34–37, back wall 38 and front wall 40 (see. FIGS. 1 and 7) configured in adjacent edge communication to define the upper case 16. Similarly, shells 30 and 32 of FIG. 11 cooperate to form lower case 14 which has side walls 42–45 (see FIG. 1), top wall 46 and bottom wall 48 which are configured in adjacent edge communication to form the lower case 14. Additional, resilient covering material encases portions of each case.

Figure 2:
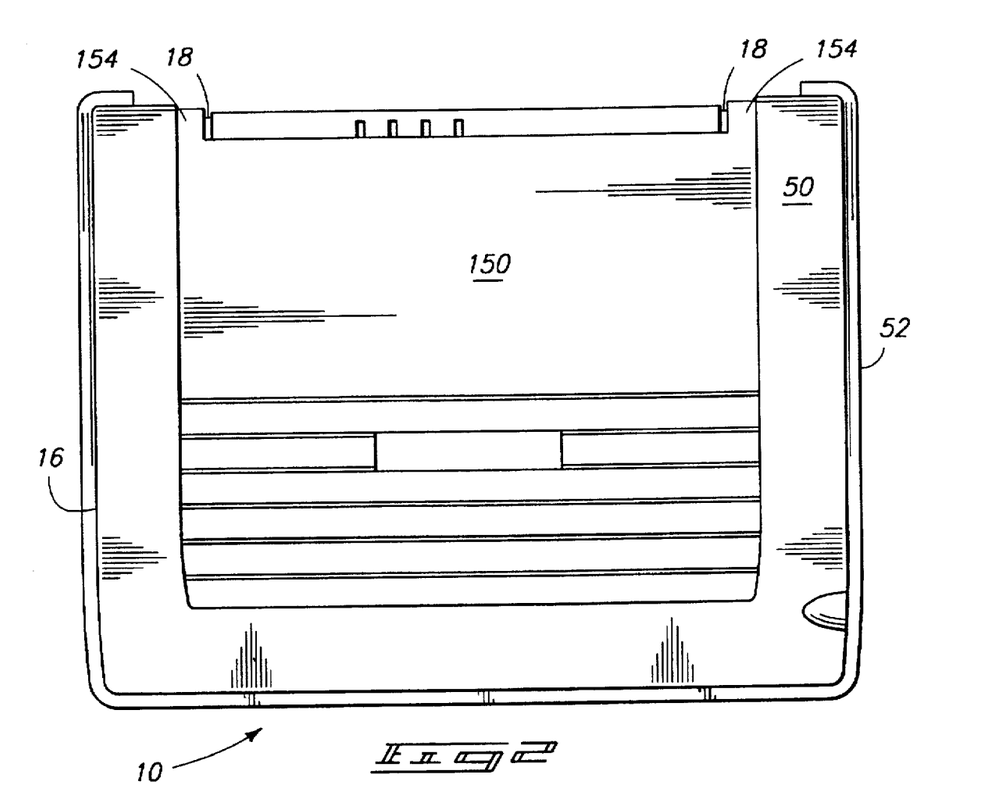
FIG. 2 is a plan view of the notebook computer of FIG. 1 illustrating the screen folded down in a closed configuration in relation to the keyboard.

As shown in FIGS. 1, 2 and 8, a top and bottom covering 50 and 52 is affixed to the top case 16 and bottom case 14, respectively. Preferably, each cover is made from an impact attenuating resilient elastomeric material such as Sorbothane™ which is a registered trademark of Sorbothane, Inc. Alternatively, various other forms of energy/absorbing or energy dissipating plastic or foam materials can be utilized to form the covering. The covering is necessarily provided on cases 14 and 16 in order to protect the housing 12 and the internal components of the computer 10 in the event of an impact with an exterior of the computer 10, either by dropping the computer, or striking the computer with another object.

Figures 11, 12:
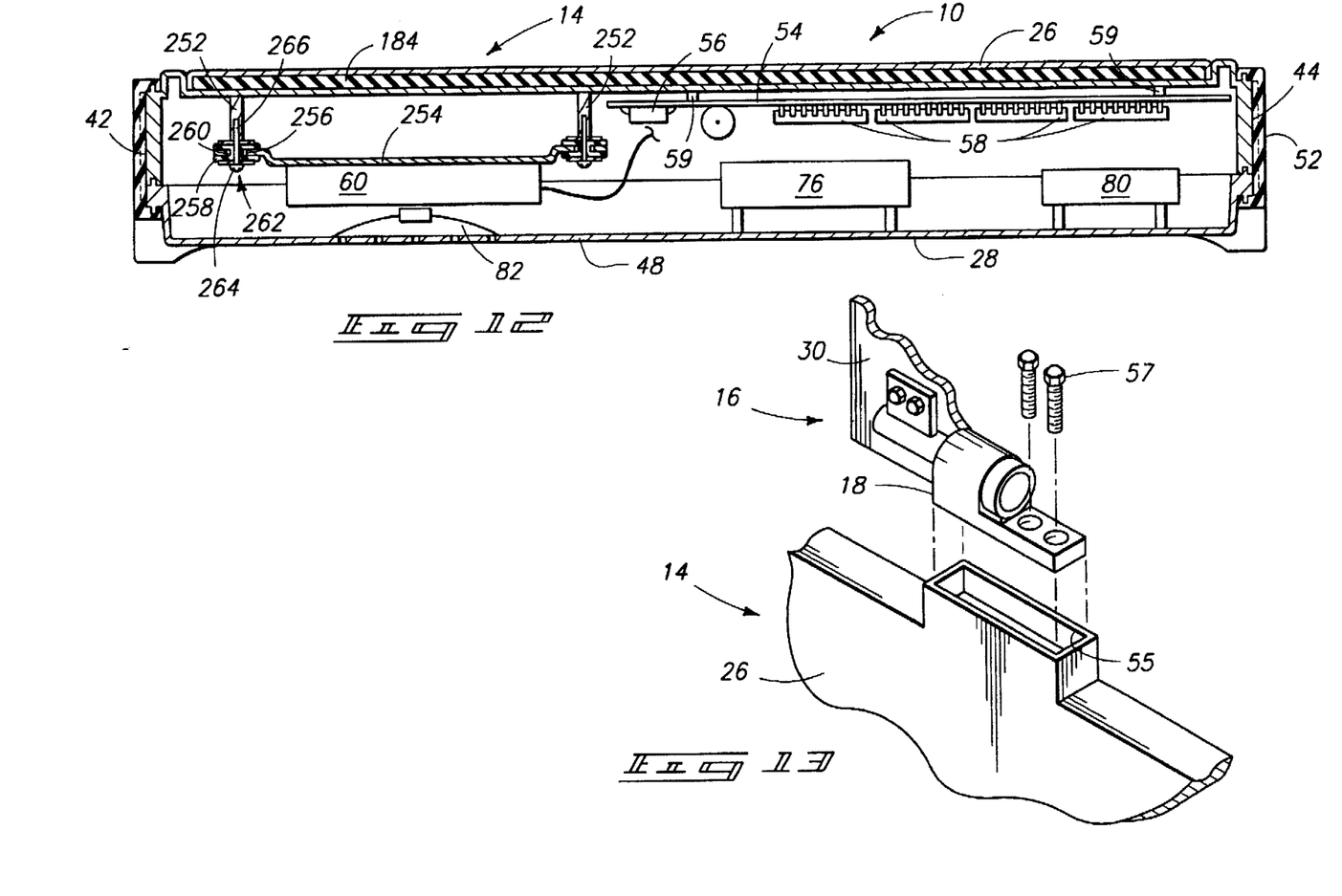
FIG. 12 is a vertical sectional view of the lower case taken generally along line 12—12 of FIG. 7.

Referring to FIG. 12, notebook computer 10 houses a motherboard 54 within lower case 14. Motherboard 54 is substantially formed by a printed circuit board on which a central processing unit (cpu) 56 and a plurality of memory modules 58 are mounted together in electrical interconnection. Preferably, motherboard 54 is mounted directly to the inside of case 14, by securing, it to bosses 59 molded directly from top shell 26. Additionally, a hard drive 60 is also mounted to the inside of case 14.

Figure 6:
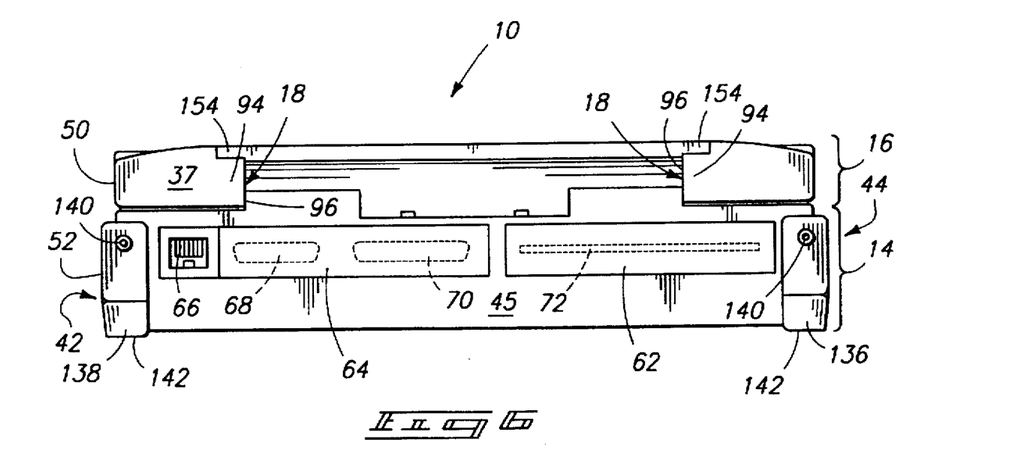
FIG. 6 is a rear elevation view of the notebook computer as depicted in FIG. 2.

As shown in FIG. 6, a pair of access covers 62 and 64 are provided along the back of case 14 behind which a number of connectors are provided to facilitate interconnection with other devices. Preferably, each cover is formed from a single piece of resilient plastic material having a hinge at a bottom edge and a resilient in-molded clip at a top edge. Preferably, a telephone jack 66 is also formed in the back wall 45 of the lower case 14 adjacent cover 64. A serial communication port 68 and a parallel communication port 70 exit case 14 through back wall 45, from behind access cover 64. Preferably, serial port 68 is an RS 232 port. Similarly, a PCMCIA slot 72 is also formed in case 14, extending through back wall 45, and is hidden from view behind access cover 62 when not in use. Additionally, an on/off switch is provided to facilitate turning the computer on and off.

In order to facilitate mobile data communication between computer 10 and other remote devices, a mobile telephone 76 is also housed within bottom case 14 as shown in FIG. 12. An antenna 78 for telephone 76 is similarly housed in top case 16 as shown in FIG. 8, beneath a rubber closure panel 79 provided in an access port 81. In order to facilitate communication between computer 10 and telephone 76, a modem 80 is also provided as shown in FIG. 12. A speaker and microphone 82 are mounted to the bottom wall 48 of case 14 in order to facilitate the transmission of audible input and output signals between a user and computer 10. For example, the-speaker and microphone 82 could-be utilized in combination with the telephone 76 to carry on telephone conversations. Similarly, the speaker/microphone 82 could be utilized in combination with software programs resident in computer 10 requiring interactive communication between a user and a computer (i.e. software implemented facsimile features or other programs requiring audible communication between the user and the computer).

In order to make computer 10 truly transportable, FIG. 10 depicts a battery tray 84 formed in bottom case 14 by an in-molded mount provided within the bottom shell 2S. Preferably, a plurality of blade contacts 86 extend vertically upward from tray 84 for mating in assembly with a battery (not shown) received within the tray. Blade contacts 86 are desirable because they tend to maintain a spring-biased electrical contact between the battery terminals and blades, even when they are subjected to jarring, as might occur during impacts or sudden accelerations to the case.

Impact Resistant Case Assembly

FIGS. 1-8 illustrate the overall relative layout and construction of housing 12 formed by joining together bottom case 14 and top case 16. Cases 14 and 16 are covered with impact attenuating coverings 52 and 50, respectively, which protect the rigid load-bearing structural components of each case formed by shells 26, 28 and 30, 32, respectively. Preferably, coverings 50 and 52 are each formed from an impact attenuating resilient elastomeric material as previously discussed hereinabove. The coverings overlay the respective cases in cooperative relation so as to effectively form a bumper encasing the housing components, or shells of the computer housing.

Particular care has been taken in designing each covering in order to cover the portions of each case that will most likely, be subjected to impacts from either dropping the computer, or hitting the computer with an object such as a foot or a heavy object. Therefore, each corner of the computer is completely covered by the covering. Furthermore, the highest projecting regions on each exterior wall or outermost surface of the computer has covering material thereover. Therefore, if the computer is dropped onto a corner, the covering will protect the rigid magnesium shell components and internal computer hardware by shock-isolating the impact and attenuating its transmission there through into the internal components of the computer. Similarly, if the computer is dropped onto the ground on any one of the faces, the covering material will isolate the rigid magnesium shell components on the computer from direct contact with the ground. Furthermore, when folded in the closed configuration, as shown in FIG. 1, covering 50 comes into direct contact with lower case 14 which prevents direct-abutting rigid contact between the hard magnesium components of each case. Therefore, covering 50 further isolates cases 14 and 16 from one another and attenuates shock transmission therebetween in the event the computer is dropped while in a folded configuration.

Figure 9:
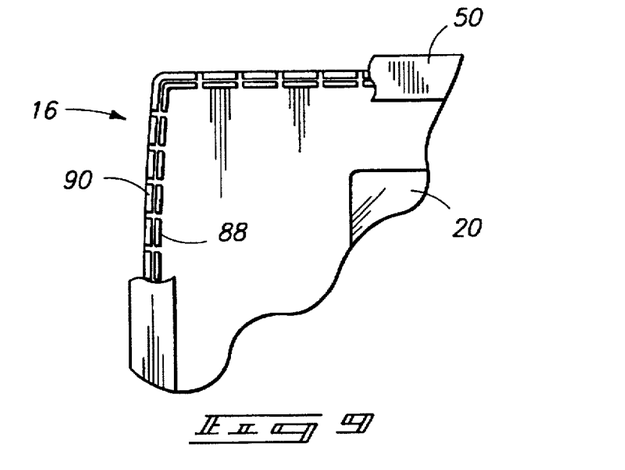
FIG. 9 is a partial breakaway view from the encircled region depicted in FIG. 8 illustrating attachment of the upper cover to the upper case.

Top case 16 is also protected from impact damage by the particular construction and attachment features depicted in FIG. 8-9 and 11. Covering 50 is fastened along the outer peripheral surfaces formed by shells 30 and 32 of upper case 16. In this configuration, the covering substantially extends about the outer periphery of the upper case so is to isolate the outer peripheral surface from direct impact with objects.

As shown m FIG. 9, both an inner and an outer row of tenons 88 and 90 are formed on front wall 40 of shell 30, adjacent a peripheral edge portion of case 16, which together ensure retention of top covering 50 to upper use 16 during normal use. Each row of tenons forms a discrete bead lip about the outer peripheral portion of the front screen wall 40, along the region where the cover attaches to the case. As shown in FIG. 11, an inner surface 92 of the covering engages with the peripheral outer face of case 16 formed by shells 30 and 32; namely, along the side wall regions 34-37. However, region 37 is separated into two discrete portions, each adjacent to where a hinge 18 is mated with lower case 14 (see FIG. 1). Therefore, covering 50 encases both portions forming region 37, and encircles a collar region 94 (see FIG. 6) formed by shells 30 and 32 where each hinge 18 extends' therethrough. Preferably, the covering has molded-in through ports 96 through which the hinges are inserted along with shells 30 and 32 during assembly.

To further ensure the retention of covering 50 to shells 30 and 32, covering 50 wraps around the back wall 38 of shell 32 where it forms a recessed lip-edge 98 as shown in FIG. 11. Lip-edge 98 conformably cooperates with shell 32 to partially entrap covering 50 to shell 32 of case 16. Additionally, the opposite edge of covering 50 has an engaging lip 100 along the inner surface 92 of the covering which terminates in a lip-edge 102, forming a first and a second engaging trench 104 and 106, respectively. Preferably, the first engaging trench 104 forms a continuous groove which mates in assembly with the inner row of tenons 88 (see FIG. 9), and the second engaging trench 106 consists of a plurality of in-molded mortises 107 discretely arranged in alignment to communicate in interdigitating engagement with the outer row of tenons 90 (see FIG. 9). As a result, tenons 88 align within trench groove 104 which substantially seals along front wall 40 of computer, and outer tenons 90 discretely engage with each mortise 107 forming engaging trench 106. With this mortise/tenon construction, any tendency of covering 50 to un-zip from upper case 16 is substantially diminished. Even in the event a corner portion of cover 50 does accidently become dislodged from shells 30 and 32, discrete interlocking of the mortises and tenons will prevent further un-zipping of cover 50 from case 16.

As shown generally in FIGS. 8 and 10, bottom covering 52 is retained along the outer periphery of shells 26 and 28 in a manner similar to that used to retain cover 50 along top case 16. Bottom covering 52 is preferably formed from impact attenuating resilient elastomeric material configured in the shape of a peripheral outer wall member. More particularly, covering member 52 of FIG. 10 has an inner face 108 which mates in assembly with an outer periphery of shells 26 and 28 forming the bottom case 14; namely, side walls 42-45 (see FIG. 1). Outer face 110 substantially forms the visible outer periphery of bottom case 14 including side walls 42-45 (see FIG. 1).

In order to ensure retention of bottom covering 52 along the outer periphery of bottom case 14, a top edge 112 and a bottom edge 114 of covering 52 form engaging lips 116 and 118, respectively, as shown in FIG. 10. Each lip 116 and 118 forms an in-turned lip-edge 120 and 122, respectively. Each lip-edge 120 and 122 defines a corresponding engaging trench 124 and 126, respectively. Trenches 124 and 126 each form a row of mortises 128 which mate with an array of complementary-corresponding tenons 130 configured along the outer periphery of lower case 14. Tenons 130 are arranged in two groups along the peripheral outer wall of the lower case. An upturned lip-edge 132 forms a plurality of tenons and a downturned lip-edge 134 forms a corresponding array of tenons.

To assemble covering 52 to the outer periphery of case 14, lip-edge 120 and engaging trench 124 are first snapped over tenons 130 on lip-edge 132. Subsequently, covering member 52 is resiliently flexed so as to peel bottom lip-edge 122 and trench 126 over the corresponding downturned lip-edge 134 on use 14. In this manner, covering 52 can be engaged about each of the bottom case side walls 42-45 (see FIG. 1) in an interlocked manner.

With respect to back wall 45 (see FIG. 6), covering 52 merely extends part way beyond the corners to form a partial covering of back wall 45 adjacent side walls 42 and 44 so as to facilitate access to input/output ports and jacks 66-72, generally, provided in the back of computer 10. As a result, end portions 136 and 138 are formed by covering 52 where it encases back wall 45. Preferably, each end portion is subsequently retained to back wall 45 preferably with a plastic rivet 140. In this manner, the ends of assembled covering 52 can be retained to prevent any tendency of the covering to un-zip from edges 132 and 134 of shells 26 and 28 (see FIG. 10) forming case 14.

Figure 3:
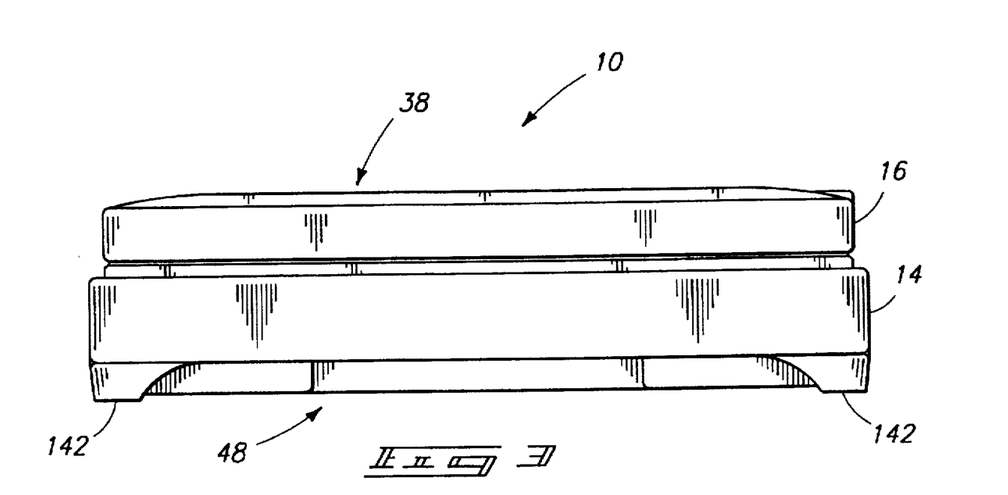
FIG. 3 is a front elevational view of the notebook computer as depicted in FIG. 2.
Figure 4:
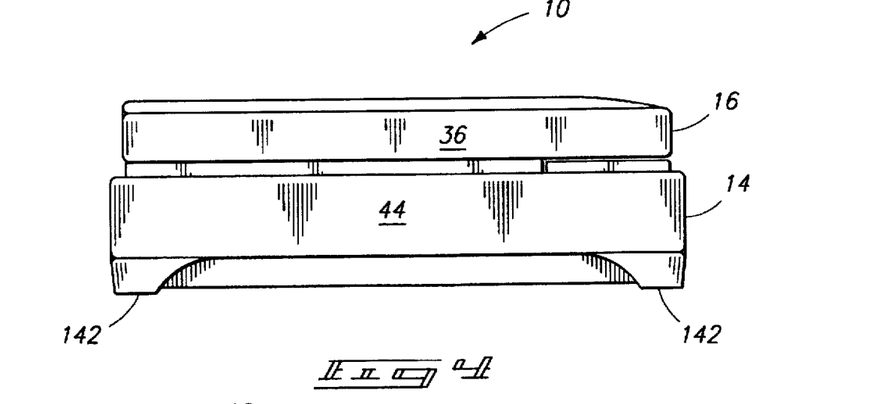
FIG. 4 is a side elevational view of the notebook computer as depicted in FIG. 2.

In order to protect the bottom of case 14 as well as to form an audible transmission path underneath the bottom wall 49 of case 14, a plurality of feet 142 are formed along each bottom corner of case 14 as shown in FIG. 3 so as to raise the wall 48 in elevation above a mounting surface on which the computer sits. More particularly, each foot 142 is formed by in-molding the foot at each of the corners along the bottom edge 114 (see FIG. 10) of cover 52 such that a semi-rectangular piece of under-tapping elastomeric material extends underneath the case when configured in the assembled state. Preferably, a fastener hole 144 (see FIG. 8) is provided through each foot such that a fastener further secures covering 52 at each corner to bottom wall 48 of case 14.

Additionally, inner face 108 of covering 52 contains a plurality of vertically extending parallel cavities 146 as shown in FIG. 10. Each cavity 146 has a semi-circular cross-sectional configuration, the cavities cooperating to form an array of semi-cylindrical vertically extending adjacent cavities 146. The cavities cooperate to facilitate flexing of cover 52 during assembly to case 14, and additionally define fingers 148 interposed between each pair of cavities that cooperate with the outer periphery of the case to enhance energy absorption of the covering resulting from any impacts supplied to the exterior of the covering acting against the case. Preferably, cavities 146 are provided substantially along the entire vertical height of walls 42-44 (see FIG. 1), with the exception of the adjacent top and bottom edges formed therealong. In this manner, cavities 146 effectively soften the padding-effect of the covering along the straight portions of each side wall.

Additionally, the omission of any cavities 146 in each corner region results in a stronger and stiffer padding at each respective corner portion. Such a construction is desirable since impacts that occur with the corners of case 14 typically result in a substantially decreased contact surface area due to the sharp protruding geometry of the case in these regions. As a consequence, a given amount of impact force must be distributed over a much reduced surface area of impact, resulting in much higher local forces in the padding, which increases the stresses being transferred to the material. Hence, it is desirable provide an impact covering having such a tailored stiffness as a consequence of incorporating cavities 146 along each side wall. Preferably, each cavity 146 terminates before the top and bottom edges 112 and 114, such that the top and bottom edges are also imparted with a solid covering or padding having a much higher stiffness with respect to the cavitied side walls.

As shown in FIGS. 1 and 2, a trim cover 150 is also mounted to the back wall 38 of top case 16 to complete the packaging of the upper case 16. Cover 150 is preferably molded from a rigid or semi-rigid plastic material having a desired color that matches the color scheme of the computer. As shown in FIG. 11, a plurality of in-molded slotted receivers 152 are formed on a bottom side of cover 150 to allow for mounting of the cover to back shell 32 of case 16 Preferably, cover 150, when fastened to case 16, has an exterior surface slightly recessed from the top most surface formed by resilient covering 50. The recessed lip-edge 98 on covering 50 supports cover 150 along its outermost edges. As shown in FIG. 2, a pair of ears 154 rearwardly extend from cover 150 in order to finish the trim of top case 16 along collar regions 94. Preferably, a plurality of spring clips 156 are mounted to shell 32 along back wall 38 with fasteners 158, as shown in FIG. 11, wherein each spring clip is provided in a location that mates with a complementary corresponding slotted receiver 152 on the back of cover 150. In this manner, cover 150 during assembly can be flexed in order to engage each of the spring clips into each of the slotted receivers which forcibly engages the bottom peripheral edge of the cover with the covering recess lip-edge 98 so as to retain cover 150 to the-lip-edge in positively-biased engagement therebetween. As a result, cover 150 is actually supported against the energy dissipating lip-edge 98 of covering 50 which isolates cover 150 from back shell 32 and attenuates any shock transmission emanating from cover 150 toward the shell. Preferably, each ear 154 (see FIG. 2) is also slightly recessed with respect to covering 50 when mated together in a final assembled configuration.

FIG. 13 illustrates a pocketed mounting construction for securely retaining upper case 16 and hinge 18 to lower case 14. More particularly, as shown in partial breakaway exploded isometric view from the rear, hinge 18 is mounted to an inside face of front shell 30, then pocketed, or received in a receptacle, or mounting well 55 of top shell 26 where it is secured with threaded fasteners 57.

Display Mounting

As shown in FIG. 11, a frictionally engaging mounting configuration is utilized to return thin panel display 20 in sandwiched engagement between the front and back shells 30 and 32 forming upper case 16. A display opening 160 is defined in front wall 40 of case 16 which turns inwardly along the opening to form a bezel 162 having an in-turned lip 164. A circumferentially extending seal 166 and 168 extends adjacent the outer peripheral of display 20, on either side, such what seal 166 mates between the screen and inner fact of shell 32 and seal 168 males between display 20 and the in-turned lip 164 of shell 30. In this manner, display 20 is inserted between shells 30 and 32, after which shells 30 and 32 are joined together by threaded fasteners (not shown) which draw them together into engagement such that seals 166 and 168, which are sized to forcibly engage with display 20, resiliently retain screen display 20 therebetween. The resulting construction frictionally engages screen display 20 between shells 30 and 32, yet allows for dissipation of impact-induced shock waves travelling through shells 30 and 32 which might otherwise travel from case 16 into screen 20. Therefore, a shock-isolated screen mount is provided within upper case 16.

Keyboard Assembly

Figure 14:
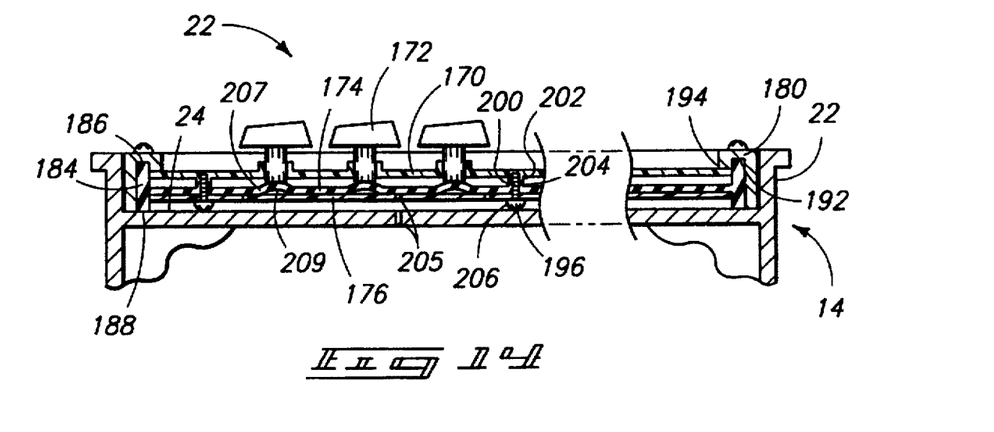
FIG. 14 is a vertical sectional view of the keyboard of the device taken generally along the line 14—14 of FIG. 7.

As shown in FIGS. 1 and 14, keyboard assembly 22 is retained to keyboard mounting face 24 where it is sealed in engagement therewith. Keyboard assembly 22 is preferably formed by a plastic key tray 170 in which a plurality of keys 172 are supported in axially moveable relation, a contiguous sheet of water impervious resilient elastomeric material 174, and a keyboard circuit board 176. Key tray 170, sheet of material 174, and circuit board 176 are preferably fastened together as a subassembly wherein the subassembly is seated on mounting face 24 formed by the top of shell 26 (see FIG. 10) of lower case 14. A keyboard bezel 180 is then secured to face 24 with threaded fasteners, which retains the keyboard subassembly against the face where it mates in sealing engagement therewith.

The sheet of material 174 is preferably formed from a silicon synthetic rubber material which enables it to seal in engagement with keyboard mounting face 24. A T-shaped peripheral edge 184 is preferably formed along the entire outer peripheral edge portion of sheet 174, wherein one leg of T-shaped edge 184 provides a peripheral top face 186 that mates in engagement with bezel 180 during assembly and a peripheral bottom face 188 that seals in engagement with mounting face 24. Alternatively, an L-shaped edge can be provided such that a resulting leg extends downwardly into engagement with mounting face 24. Peripheral top face 186 defines a well on the top of the sheet in which key tray 170 is received in final assembly. Similarly, peripheral bottom face 188 forms a well into which keyboard circuit board 176 is received in assembly.

Preferably, the maximum thickness of circuit board 176 is less than the depth of bottom face 188 which ensures forcible retention and sealing of bottom face 188 with mounting face 24 formed by the case. Essentially, bottom face 188 forms a face portion that seals in engagement with mounting face 24 when bezel 180 is fastened downwardly against the top of the case.

In order to ensure even, forcible and sealing engagement of keyboard assembly 22 with mounting face 24, bezel 180 provides a retainer including an engaging face portion 192 that seats in engagement with top face 186 of sheet 174 when arranged in an assembled configuration. As shown in FIG. 14, engaging face portion 192 is formed beneath an inner lip-edge 194 extending about the entire inner circumference of bezel 180. Additionally, mounting holes (not shown) are provided in bezel 180 for receiving threaded fasteners which forcibly engage bezel 180 against sheet, 174 and case mounting face 24. The fasteners provide a means for forcibly engaging bezel 180 with sheet 174 in sealing engagement with mounting face 24 entirely circumferentially thereabout.

In order to maintain a complete seal between the outer surface of the sheet of material 174 occupied by the keys 172 and an inner surface below sheet 174 occupied by the circuit board 176, a sealed fastener construction is implemented to engage key tray 170, sheet 174 and circuit board 176 in pre-assembled relation. Namely, circuit board 176 is provided with fastener through-holes 196 in alignment with through-holes 200 formed in sheet of material 174 and internally-threaded bosses 201 formed on the bottom of key tray 170. An encircling rib 204 is integrally formed in sheet of material 174 about each through-hole 200 such that, when a fastener 206 is received through the corresponding holes in the circuit board, sheet of material, and the threaded bosses of the key tray, the encircling ribs 204, of sheet 174 seal in engagement with the ends of the bosses 202 as well as the bottom of key tray 170. As a result, any water that would otherwise migrate past keys 172 and through key tray 170 is prevented from leaking through through-holes 200 formed in the sealing sheet 174.

Preferably, the sheet of membrane material 174 has a plurality of in-molded raised dimples 207 that are formed beneath each key 172 and directly above a key circuit element 209 formed on the circuit keyboard 176 beneath each key 172. In this construction, raised dimple 207 preferably functions as a spring that ensures biasing apart of key 172 from circuit element 209 when in a relaxed state. When a user depresses a key 172, dimple 207 is compressed which brings key 172 in close proximity to key circuit element 209 where its motion is detected by one of several readily known techniques. One technique for detecting a depressed condition of a key utilizes a capacitive key wherein the key circuit element forms two spaced apart metallic areas and the key end has a plated pad formed from a material such as tin, nickel, or copper such that when the key end is brought in close proximity to the circuit element, a capacitive change is noted by the circuit board and a key-depressed state is acknowledged by a corresponding keyboard microprocessor and logic unit. An alternative construction incorporates a hard-contact keyboard, wherein the key has a stem that directly engages with the depressed dimple in close proximity with a pair of contacts comprising the circuit element which are then brought into electrically-communicative relationship therebetween. Additionally, or alternatively, separate individual springs can be provided to ensure that each key 172 remains in an upward resting state in relation to dimple 207. Furthermore, a plurality of breather holes 205 are preferably formed in both circuit board 176 and mounting face 24 in order to prevent trapping of air beneath each dimple 207 which might result in locally sealed and pressurized dimples that could affect the touch-and-feel of the dimples and keys as they are depressed by a user.

Cursor Control Device

Figure 15:
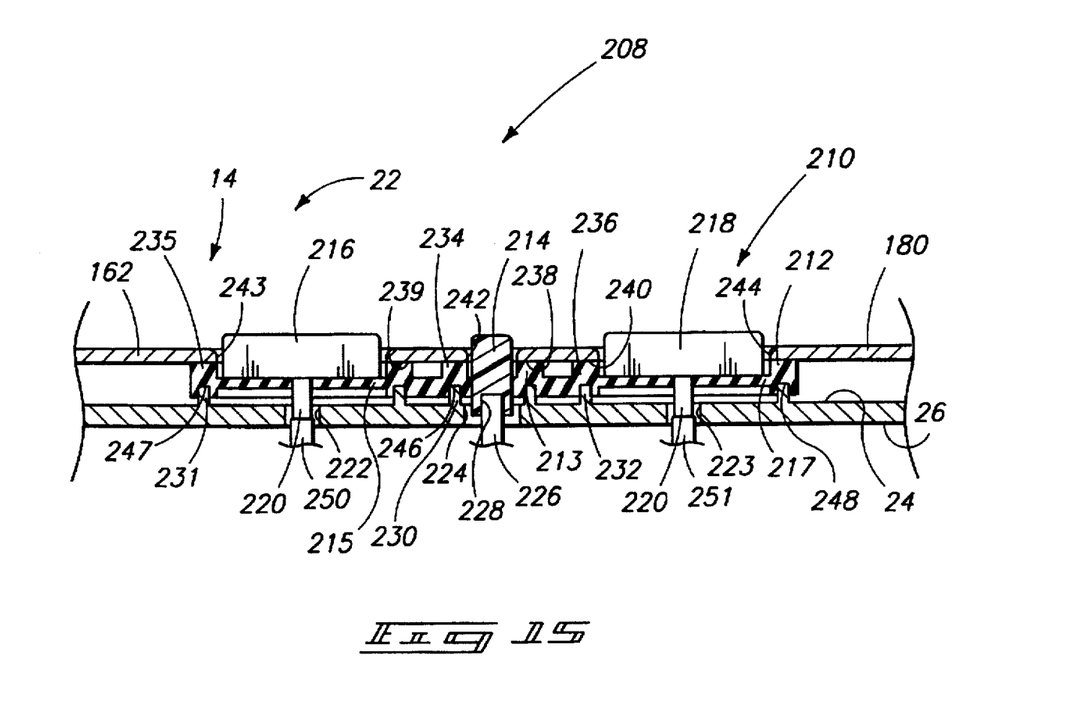
FIG. 15 is a vertical sectional view of the mouse assembly taken generally along the line 15—15 of FIG. 7.

As shown in FIGS. 7 and 15, a cursor control device 208, otherwise known as a tactile input device, preferably in the form of a pointing stick, is also provided in sealed engagement with mounting face 24 of lower case 14 adjacent to the front edge of keyboard assembly 22. Tactile input device 208 includes a weather sealed covering 210 consisting of a skirt 212 molded from resilient elastomeric material, a wand casing 214, and a pair of button casing 216 and 218 which are in-place molded during formation of skirt 212. Skin 212 forms a local depression 213, 215, and 217 about each of casings 214, 216, and 218, respectively. Preferably, molded skirt 212 is formed from a synthetic rubber material. As a result, casings 214–218 are completely sealed with skirt 212. As shown in FIG. 15, wand casing 214 is formed centrally in the skirt and the pair of button casings 216 and 218 are formed bilaterally of wand casing 214. Additionally, each button casing 216 and 218 has a downwardly extending stem 220 that extends through a hole 221 and 223 respectively, formed within mounting face 24. Additionally, a central hole 224 is also formed for wand casing 214 wherein a mouse wand 226 extends up through hole 224 where it mates within a recess 228 in the bottom of wand casing 214.

In order to seal skirt 212 against mounting face 24, a plurality of prominences, or raised gasket faces 230–232 are integrally formed on mounting face 24 such that each gasket face is aligned to mate with a thickened encircling rib 234–236 formed about wand casing 214 and button casings 216 and 218, respectively. Each encircling rib 234–236 is formed by a thickened portion of skirt 212 such that a top most portion of the encircling rib 234–236 is forcibly engaged by a corresponding engagement face 238–240, respectively, formed about openings 242–244 in bezel 180. In this manner, the fasteners used to forcibly engage bezel 180 when sealing keyboard assembly 22 also forcibly engage faces 238–240 with encircling ribs 234–236, respectively, which forcibly and sealingly engages each gasket face 230–232 within a complementary corresponding sealing groove 246–248, respectively, provided in an encircling manner about each wand casing 214 and button casings 216 and 218, respectively.

Wand casing 214 in cooperation with mouse wand 226 produces a finger engagable wand which is user operable from the exterior of the computer, yet seals mouse wand 226 from fluid contaminants entering therein. Additionally, each button casing 216 and 218 engages through a dedicated button stem 220 with a clicker button 250 and 251 mounted within bottom case 14.

Hard Drive Assembly

In order to further isolate hard drive 60 as mounted in impact-attenuating housing 12 of FIG. 12, an isolation mount assembly is utilized to support the hard drive inside the lower case 14. More particularly, as shown in FIG. 12 four different bosses 252 are integrally formed from top shell 26 to which a mounting bridge 254 that supports the hard drive 60 is retained. Four corresponding mounting apertures 256 are formed in the mounting bridge. A grommet 258 having a receiving groove 260 formed on its outer periphery seats within the aperture and a fastener receiving hole 262 is provided through the grommet. Subsequently, a threaded fastener 264 having an expanded head with a washer is received through the grommet and aperture of bridge 254 into a correspondingly threaded bore 266 in each boss 252. As a result, mounting bridge 254 is retained in shock-isolated and suspended engagement with each of bosses 252, and hard drive 60 is retained to a portion of bridge 254 with threaded fasteners (not shown).

Preferably, mounting bridge 254 is formed from a light-weight piece of aluminum. Additionally, bridge 254 is preferably sized with a thickness and width chat imparts a tuned bending stiffness in relation to the mass of hard drive 60 such that shock-induced vibrations input to housing 12 (see FIG. 1) from externally applied impacts minimize local accelerations of the hard drive caused by the bending of the bridge in response to forces created from the mass of hard drive 60 as it is subjected to accelerations and decelerations.

Preferably, a hard drive 60 having an outer diameter of 1.8 inches is preferably utilized since a hard drive of this construction generally has a smaller mass than alternatively available hard drives. By attempting to minimize the mass of hard drive 60, relative acceleration forces produced by the hard drive that tend to cause bending of bridge 254 are minimized. Essentially, the lighter the mass of drive 60, the less likely a given bridge 254 structure having a given stiffness will overly-stress the bridge, resulting in large-scale bending deformations of bridge 254 and potentially large local decelerations of hard drive 50 in response to the mass-induced deformations.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An impact resistant portable personal computer having a housing including a top case and a bottom case, a motherboard having a hard drive assembly and a central processing unit in combination with memory modules, and a keyboard assembly including a keyboard supported along a top face of the bottom case, wherein a screen is supported within the top case and the top case is rotatably carried by the bottom case, the computer comprising:

a covering formed from an impact attenuating resilient elastomeric material configured to at least partially overlay the housing of the computer such that the inner face of the covering substantially conforms to the outer face of the case;

a hard drive;

a shock-isolating mounting bridge configured to support the hard drive within the computer bottom case having at least one mounting aperture configured to receive an isolation grommet having a through-hole for receiving a fastener to mount the bridge via the fastener to the inside of the case in resiliently retained relation so as to secure the hard drive within the case in a compliant and impact attenuating manner;

wherein the resulting impact attenuating housing and bridge mounted hard drive facilitate use of the portable computer under harsh conditions.

2. The computer of claim 30 wherein the hard drive is a 1.8 inch diameter hard drive having a mass sized in relation to the bending stiffness of the bridge so as to impart a tuned bending of the bridge in response to deceleration forces of the hard drive resulting when the housing is subjected to impact-induced shock loading.

3. The computer of claim 1 further comprising at least one hinge having a first face configured for mounting to the top case and a second face rotatably carried by the first face and configured for mounting to the bottom case, the bottom case further comprising a mounting well provided within a surface of the bottom case configured to receive the hinge second face in pocketed relation therein so as to provide enforced resistance to any forces produced therebetween as a result of impact-induced shock loading to the housing.

4. The computer of claim 1 wherein a plurality of shells comprising the computer housing are substantially formed from magnesium.

5. The computer of claim 1 wherein the top case comprises a back shell and a front shell, the front shell having a screen bezel therein in which the front face of the screen in assembly can be viewed by a user, and the bottom case comprises a top shell and a bottom shell, the top shell providing the keyboard top face upon which the keyboard is retained.

6. The computer of claim 5 wherein at least one circumferentially extending resilient seal is provided along an outer peripheral portion of the screen such that the screen is sandwich-mounted in resilient isolated relation with the front shell and back shell so as to frictionally retain the screen therebetween in an impact induced shock attenuating manner.

7. The computer of claim 1 further comprising a mobile telephone having an antenna and a modem configured to enable the computer to remotely transmit and receiver information over the mobile telephone.

8. The computer of claim 7 further comprising a speaker and a microphone configured in the bottom face of the bottom case, wherein the covering partially covers the bottom face so as to provide a gap between the speaker and microphone in relation to a surface on which the computer is supported in use which enables audible sound transmission therebetween.

9. The computer of claim 1 further comprising a tray provided in the bottom case configured to receive a battery and including a plurality of elongate blade electrical contacts constructed and arranged to electrically engage with corresponding battery electrical contacts during assembly.

10. An impact resistant portable personal computer having a housing including a top case and a bottom case, a motherboard having a hard drive assembly and a central processing unit in combination with memory modules, and a keyboard assembly including a keyboard supported along a top face of the bottom case, wherein a screen is supported within the top case and the top case is rotatably carried by the bottom case, the computer comprising:

- a covering formed from an impact attenuating resilient elastomeric material configured to at least partially overlay the housing of the computer such that the inner face of the covering substantially conforms to the outer face of the case;
- a hard drive;
- a mounting bridge configured to support the hard drive within the computer bottom case having at least one mounting aperture configured to receive an isolation grommet having a through-hole for receiving a fastener to mount the bridge via the fastener to the inside of the case in resiliently retained relation so as to secure the hard drive within the case in a compliant and impact attenuating manner;
- a mobile telephone having an antenna and a modem configured to enable the computer to remotely transmit and receiver information over the mobile telephone;
- a speaker configured in the bottom face of the bottom case, wherein the covering partially covers the bottom face so as to provide a gap between the speaker in relation to a surface on which the computer is supported in use which enables audible sound transmission therebetween;
- wherein the resulting impact attenuating housing and bridge mounted hard drive facilitate use of the portable computer under harsh conditions.

11. The computer of claim 10 further comprising a microphone configured in the bottom face of the bottom case, wherein the covering partially covers the bottom face so as to provide a gap between the microphone in relation to a surface on which the computer is supported in use which enables audible sound transmission therebetween.

12. The computer of claim 11 wherein the mobile telephone is carried in the metal bottom case in spaced-apart relation with the antenna.

13. The computer of claim 10 wherein the bottom case is formed substantially from metal material and the central processing unit is housed within the metal bottom case, and the computer further comprising an antenna carried by the top case in a configuration separated from the central processing unit by the metal bottom case.

14. The computer of claim 10 wherein the housing comprises a magnesium housing.

* * * * *

UNITED STATES PATENT AND TRADEMARK OFFICE
CERTIFICATE OF CORRECTION

Page 1 of 3

PATENT NO. : 5,706,168
DATED : January 6, 1998
INVENTOR(S) : William F. Erler, et. al.

It is certified that error appears in the above-identified patent and that said Letters Patent is hereby corrected as shown below:

Title page,
In the Abstract:

In the Abstract, 4th line, delete "a" and insert --an--.

In the Abstract, 7th line, delete "die" and insert --the--.

Figure 5:
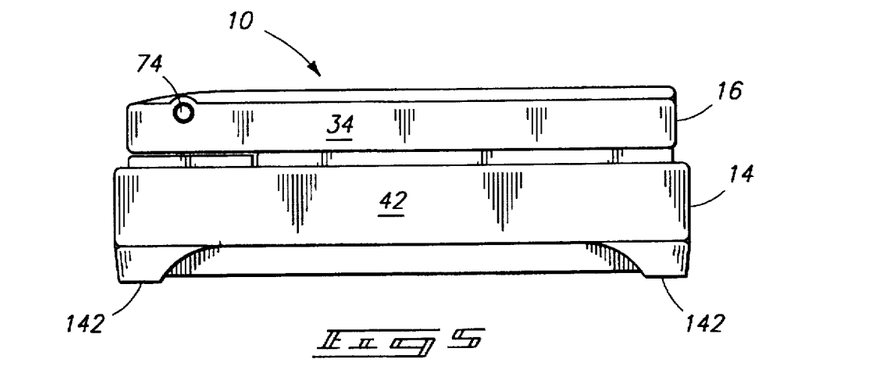
FIG. 5 is a side elevational view of the notebook computer opposite to that depicted in FIG. 4.

In the Drawings:

In Figure 5, delete reference numeral "74".

In Figure 14, delete reference numeral "22" adjacent reference numeral "180", and insert --26--.

Column 2, line 18, delete "mining" and insert --ruining--.

Column 2, line 24, delete "it's" and insert --its--.

Column 2, line 45, delete "advantageous" and insert --advantages--.

Column 2, line 64, delete "advantageous" and insert --advantages--.

Column 3, line 14, regarding Fig. 6, delete "elevation" and insert --elevational--.

UNITED STATES PATENT AND TRADEMARK OFFICE
CERTIFICATE OF CORRECTION

PATENT NO. : 5,706,168
DATED : January 6, 1998
INVENTOR(S) : William F. Erler, et. al.

It is certified that error appears in the above-identified patent and that said Letters Patent is hereby corrected as shown below:

Column 3, line 34, regading Fig. 13, delete "uppercase" and insert --upper case--.

Column 3, line 51, delete "upper case 15" and insert --upper case 16--.

Column 3, line 67, delete "shells 26-42" and insert --shells 26-32--.

Column 5, line 11, delete "shell 2S" and insert --shell 28--.

Column 5, line 34, delete "likely," and insert --likely--.

Column 5, line 39, delete "has covering" and insert --have covering--.

Column 5, line 61, delete "so is to" and insert --so as to--.

Column 6, line 30, insert --the-- before "computer".

Column 7, line 2, delete "use 14" and insert --case 14--.

Column 7, line 25, delete "under-tapping" and insert --under-lapping--.

Column 8, line 44, delete "peripheral" and insert --periphery--.

Column 8, line 46, delete "fact of shell 32" and insert --face of shell 32--.

Column 9, line 4, delete "retains" and insert --retain--.

Column 9, line 38, delete "sheet, 174" and insert --sheet 174--.

UNITED STATES PATENT AND TRADEMARK OFFICE
CERTIFICATE OF CORRECTION

PATENT NO. : 5,706,168
DATED : January 6, 1998
INVENTOR(S) : William F. Erler, et. al.

It is certified that error appears in the above-identified patent and that said Letters Patent is hereby corrected as shown below:

Column 9, line 51, delete "bosses 201" and insert --bosses 202--.

Column 9, line 56, delete "204, of" and insert --204 of--.

Column 10, line 35, delete "casing 216" and insert --casings 216--.

Column 10, line 45, delete "hole 221" and insert --hole 222--.

Column 10, line 53, delete "mare" and insert --mate--.

Column 11, line 25, delete "a portion"; insert --a center portion--.

Column 11, line 28, delete "chat" and insert --that--.

Column 11, line 45, delete "drive 50" and insert --drive 60--.

Colum 12, line 16, claim 2, delete "claim 30" and insert --claim 1--.

Column 12, line 50, claim 7, delete "receiver" and insert --receive--.

Column 13, line 22, claim 10, delete "receiver" and insert --receive--.

Signed and Sealed this

Seventeenth Day of November, 1998

BRUCE LEHMAN

Attest:

Attesting Officer

Commissioner of Patents and Trademarks